Jan. 18, 1966 C. E. DAVIS ETAL 3,230,358
INTEGRATOR-DIGITIZER FOR FLUCTUATING DATA
Filed Feb. 26, 1962 5 Sheets-Sheet 1

INVENTORS:
CLOVIS E. DAVIS
WILLIAM A. RIGGS
BY: *Oswald H. Milmore*
THEIR ATTORNEY INVENTORS:
CLOVIS E. DAVIS
WILLIAM A. RIGGS
BY: Oswald H. Wilmore
THEIR ATTORNEY INVENTORS:
CLOVIS E. DAVIS
WILLIAM A. RIGGS
BY: *Oswald H. Milmore*
THEIR ATTORNEY United States Patent Office 3,230,358
Patented Jan. 18, 1966

3,230,358
INTEGRATOR-DIGITIZER FOR FLUCTUATING DATA
Clovis E. Davis and William A. Riggs, Pasadena, Tex., assignors to Shell Oil Company, New York, N.Y., a corporation of Delaware
Filed Feb. 26, 1962, Ser. No. 175,584
10 Claims. (Cl. 235—183)

The invention relates to a device for analyzing fluctuating data having the form of (or converted by a transducer into) a fluctuating electrical voltage. More particularly, it is concerned with digitizing such voltages, to produce a sequence of numerical outputs which represent the time-integrals of successive excursions in the input signal, that is wherein each integral extends over a time period including one rise and fall of signal amplitude.

The invention is applicable to a variety of different types of input signals representing various data on physical phenomena, such as pressure, temperature, vibration, adsorption of radiations and thermal conductivity. A specific example is the output from a capillary or other gas-liquid chomatographic instrument (herein for brevity called a GLC unit), wherein the signal is an electrical voltage and represents the measurement made on the effluent stream from the GLC unit of a property of the stream, e.g., thermal conductivity as measured in a conductivity cell, the said signal increasing from a base amplitude, such as zero, each time a component separated in the GLC unit passes through the cell and returning to or toward the base amplitude, so that a curve in which ordinates represent the signal amplitude and abscissae time would display a series of excursions or peaks above a base line. An "excursion" of the signal amplitude, as used herein, includes one rise and fall of said curve, even when the fall does not extend to the base, as when the next excursion commences before the end of the previous excursion. Such excursions are often—although less accurately—called "peaks."

As applied to GLC practice, each of the areas under the curve excursions indicates the amount of a particular component of a test sample separated in the GLC instrument. In this and many other applications the height of the excursion as such is not usually of interest; rather, the area between the curve and the base line for each excursion is desired.

Recent advances in various measuring devices, such as in capillary GLC instruments, have greatly improved the resolution, and sharp excursions, often occurring at close intervals and even overlapping, are produced. When the signal excursions overlap the signal amplitude does not return to the base level before again increasing. This fact makes it necessary to detect with a minimum of delay the instant that the amplitude starts to rise; otherwise resolution of the signal is not attained in the output data.

It is known to record such signals by means of a recording pen which is moved by a pen-deflecting mechanism of the potentiometric type on a chart and draws the curve, and to integrate the areas under the curve excursions in various ways, as by a mechanism which is sensitive to the pen deflection. A drawback of such devices is that they are capable of responding rapidly to changes in the input signal and are not able to resolve short, sharp peaks because they are dependent on the performance of the recorder. Further, peak attenuation, e.g., by a shift in scale, is often necessary to cope with large signals while permitting small ones to be recorded.

Known devices capable of improved resolution and adapted to digitize the signal excursions are subject to the drawback that they are complex and costly.

Still another drawback has been that the known devices have required skilled operators to attend the recording and/or the analyzing operation.

It is the general object of the invention to provide an improved device for integrating and digitizing the excursions in fluctuating data which can effect a good resolution of short excursions, even when the excursions occur at short intervals or are in overlapping relation.

Further objects are to provide an integrator-digitizer of the type indicated which avoids the drawbacks noted above, and is simple to operate.

A further object is to provide a differentiator amplifier capable of detecting the starts in the rise of a signal (or the start of a fall) regardless of the signal level.

Still other objects are to provide an integrator-digitizer which operates directly from the signal produced from a measuring instrument or detector, with no dependence on the accuracy and response speed of a recorder; to improve the capability of sensing the demarcation between excursions; which can be operated with a high counting rate, such as 5,000 to 10,000 counts per second, to achieve improved accuracy and obviate the need for peak attentuation; and which can be operated unattended to reduce the likelihood of error in data handling.

In summary, the integrator-digitizer of the invention comprises a voltage-to-frequency converter which is connected to the system input and generates electrical pulses at a frequency corresponding to the input voltage; a resettable, multi-digit counter which is connected to the converter output; a memory or buffer storage unit which is connected to the counter through a plurality of gated circuits, said gate (or gates) being normally closed (i.e., non-conducting), for the simultaneous transfer of the totals from all digits to the memory unit when the gate(s) is (are) opened; differentiator sensing means, such as the differentiator amplifier to be described, connected in any suitable manner to receive the said system input or to any other circuit element which carries the signal or a function thereof, for detecting the instant when the input signal starts to rise and emitting a signal to a control means which inhibits the counter for a short predetermined time period, opens the said gate(s) for a short time period which is included within the said predetermined time, and thereafter resets the counter; and means for recording the data that are in the memory unit.

The means for recording the data preferably includes a printer or punching device, e.g., a printer of the type used in desk adding machines or a motorized tape punch or card punch machine, which includes a plurality of individually settable control elements for selecting the print characters or punch positions which elements are sequentially set by a scanner, said scanner being placed into operation following a transfer of data to the memory unit to scan the digit positions of the memory unit sequentially and set the said control elements and to cause printing or punching.

While the invention is generally applicable to any system of counting the pulses, i.e., using numbers based on any radix, it is preferred to accumulate the pulses initially in a decade counter having several bi-stable elements for each decimal digit, which count in binary code, whereby there will be four of such elements for each digit position, and to provide as many bi-stable elements in the memory unit as there are in the counter. When binary counters are used there is but one bi-stable element for each digit position. In any case, there is a separate connecting circuit for each bi-stable element, so that the data can be transferred rapidly from the counter to the memory unit. Unless printing or punching is in binary notation, the recording means includes a binary-to-decimal converter between the scanner and the control elements of the printer or punching device.

Further, to record an indication of the time of occurrence of the excursion represented by the recorded integral, the counter preferably includes an additional section wherein time information is accumulated from a time-pulse emitter, the memory unit and recorder having a suitable number of additional positions for recording, viz., printing or punching, the retention time alongside of the integral. When the time-pulse emitter generates a sequence of pulses at equal time intervals, time advances monotonically during a run; the section of the counter used for time-counting is in this arrangement not reset at the end of a transfer operation; it may, however, optionally be inhibited as previously described. However, when the time-pulse emitter emits codes representing actual times or elapsed time from the start of a run, resetting is necessary.

It may be noted that throughout this specification reference will be made, for convenience and brevity, to the start of an excursion as being indicated by a rise in the input signal. However, it is evident that the invention is equally applicable to detecting falls in level, e.g., from a base level above zero, or by signals which turn negative.

The invention will be described in detail with reference to the accompanying drawings forming a part of this specification and showing, by way of example, certain preferred embodiments, wherein.

To facilitate the understanding of the invention the principal components and their operation will first be described with reference to the box diagram, the simplified circuit of FIGURE 2 and the example of FIGURE 3. Thereafter a more detailed description of certain exemplary components is presented.

Figure 1:
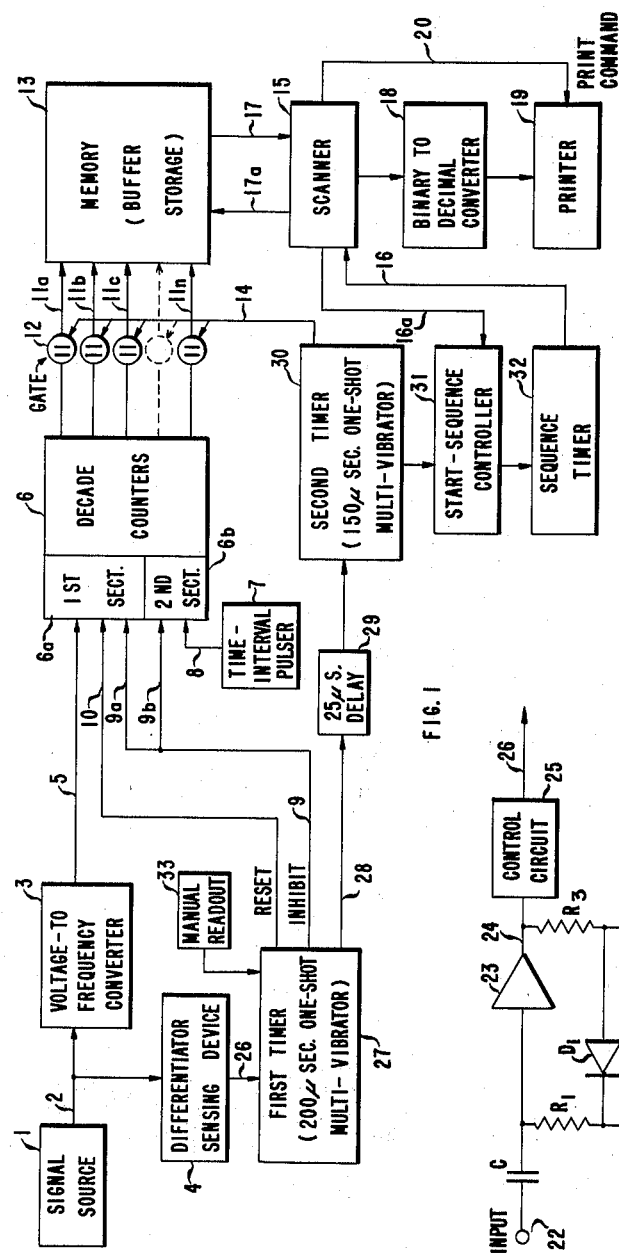
FIGURE 1 is a box diagram showing the principal components of the integrator-digitizer according to the invention.

Referring to FIGURE 1, 1 represents a source of an electrical voltage which varies with time, such as a thermocouple bridge of a GLC detector cell, or an electrometer by which a high-impedance signal is amplified. The source is connected by an input circuit 2, which constitutes the system input, to a voltage-to-frequency converter 3 and to a differentiator sensing device 4.

The converter 3 may be of any suitable type, preferably an electronic converter (e.g., Model 240 available commercially from Vidar Corporation, of Mountain View, California, described in their bulletin Voltage-To-Frequency Converters, Series 240, dated September, 1960); but permissibly, in some applications, a converter operating on some other principle may be used, e.g., an optical chopper which interrupts a beam of light falling on a photo-cell at a frequency which is proportional to the input voltage. Because such devices are known no further description is necessary herein. The converter produces in an output circuit 5 a series of electrical pulses at a frequency corresponding to the input signal voltage, (usually proportional thereto when the base level is zero volts). Exact proportionality is not always essential, as when a constant quantity is added to or subtracted from said input voltage or when the voltage is corrected for linearity, e.g., to apply a correction to the voltage to compensate for characteristics of the source detector. Typically, the output range of the converter may be from zero to 10,000 pulses per second for the full range of voltage variation, and the full-scale sensitivity may be selected in accordance with the nature of the source signal, e.g., from 100 millivolts to 1,000 volts.

A multi-position, resettable counter 6 is employed as two separate counters 6a and 6b to accumulate separate totals. When the counter has eight decimal positions, five of them may constitute the first or integrating section 6a and the other three the second or time-counting section 6b. These sections have independent inputs, the former being connected to the circuit 5 and the latter to a time-interval pulser 7 via a circuit 8. The pulser emits electrical pulses at equal time intervals, e.g., one to fifteen seconds. Such a counter is preferably of the electronic type (e.g., model 308A available commercially from Computer Measurement Co. of Sylmar, California). Although a decade counter is preferred, the invention is not limited thereto. In such a decade counter each digit position includes four bi-stable elements, such as flip-flop circuits representing respectively the decimal numbers 1, 2, 4 and 8, interconnected for carryover to the next digital position within the sections. There are, therefore, in the preferred embodiment four bi-stable elements for each decimal digit position in the counter 6. The two inputs to the counter have normally open gates (although a gate for the second section is not always necessary and is omitted in FIGURE 5). These gates, when closed, inhibit the counter sections against accepting pulses. The gates are closed by applying a negative inhibiting voltage to circuits 9a and 9b. The first counter section can be reset to zero by applying a reset voltage as indicated at 10; however, as will appear, the circuit 10 can in practice be identical with 9a and carry a positive reset pulse.

Each of the bi-stable elements of the counter is connected by a separate circuit 11a, 11b ... 11n (thirty-two circuits when there are eight decade positions) to corresponding bi-stable memory elements, such as thyratrons, of a memory device 13. These circuits are controlled by a normally-closed electronically controlled gate 12. Although a separate gate is, for clarity, shown for each circuit, a single gating circuit 14 can in practice be used to control all circuits 11. A pulse in circuit 14 opens the gates. The memory unit 13 may have, as the bi-stable elements, thyratron control grids which are connected to the several circuits 11 to fire immediately upon opening of the gate 12 when the corresponding bi-stable element of the counter is in that one of its two conditions which denotes the presence or absence of a binary bit.

A scanner 15, which includes an electro-mechanical stepping switch and actuator, is controlled by a circuit 16 and emits a signal in circuit 16a when scanning is completed. The scanner is connected to the memory unit 13 by a plurality of circuits 17 to test the digit positions sequentially, viz., to test each group of four bi-stable elements simultaneously when decade counting is used, and to transfer the data by a corresponding plurality of circuits to a binary-to-decimal converter 18. At the end of the scanning operation a signal is transmitted by circuit 17a to reset the group of bi-stable elements in the memory. The output data from the converter 18 are transmitted, digit by digit, to the control elements of a printer 19. In one specific example the control elements are ten solenoids, each of which selects a different character from 0 through 9 to be printed in any one position. As is well known in the adding machine art, a manual keyboard may have only one key for each character. When the character for any printing position has been selected, the next depression of a key selects the character for the next digital position to the left. Such a printer may be used, and the above-mentioned solenoids are then arranged to depress the keys, so that a single set of ten solenoids can set up an entire printing line. It is evident that 19 may equally denote a card-punching or a tape-punching machine, in which the data are transmitted to the code magnets which select the punching positions.) When all decade positions have been scanned a print (or punch) command pulse is transmitted from the scanner to the printer (or punch) via a circuit 20, e.g., to an eleventh solenoid, to cause printing (or punching) of the composite number which includes the counts previously accumulated in counter section 6a and the retention time from the counter section 6b.

The differentiator sensing device 4 may be any device capable of sensing an increase in the input voltage, both from a constant or zero level and from a decreasing condition. Thus, on adjacent excursions which overlap, i.e., are not completely resolved, this change in voltage may be superimposed on a large signal, so that the detection of the inflection cannot depend on a zero or constant voltage condition between peaks. It is, therefore, important that the sensing device be capable of detecting any start of an increase in input signal voltage promptly, independently of the voltage level prevailing at the time and, within limits, regardless of the speed with which this change occurs.

Figure 2:
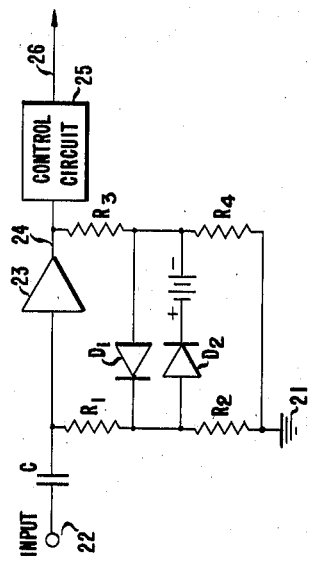
FIGURE 2 is a simplified schematic diagram illustrating the principle of the differentiator sensing device.

A sensing device which is particularly useful for this purpose is a differentiator amplifier, the principles of which are indicated in FIGURE 2 and which will be described more completely, in slightly modified form, in connection with FIGURE 4. It has an RC input circuit designed to exhibit a very long time constant and effect high amplification for small direction changes in input signal voltages and a very short time constant and low amplification for signal voltages after they have changed direction of travel by a predetermined amount.

Referring to FIGURE 2, the input signal is applied between ground 21 and a terminal 22 to an input circuit formed by capacitor C and resistors $R_1$ and $R_2$. An operational D.C. amplifier 23 (preferably comprising choppers and an electrometer input tube to attain stability and operate with the unusually long time constant) is connected to the junction of the capacitor C and $R_1$, and the amplifier output circuit 24 is connected to a control circuit 25 which contains suitable elements, such as a Schmitt trigger, for emitting a sharp pulse in circuit 26 when an amplified signal appears in circuit 24. The amplified signal is inverted from the input. The circuit 24 is further connected to a feed-back circuit which includes two branches: diode $D_1$ in one branch, and a bias battery B and a diode $D_2$ in the other, the diodes being oppositely connected as shown to the junctions of $R_1$ and $R_2$. The connection of circuit 24 to the feedback branches may be through a dividing network $R_3$, $R_4$, although a direct connection may be used (as will appear in FIGURE 4). When no feedback occurs through the diodes (i.e., with no amplified signal in circuit 24), the time-constant of the input circuit is $C(R_1+R_2)$, which may be long, e.g., ten to sixty seconds; any change in voltage at terminal 22 is thereby impressed almost fully on the input to the amplifier 23, causing an abrupt change in the voltage of circuit 24. The voltage at which feedback occurs is determined by the diodes and the bias battery; it occurs only when the voltage in circuit 24 is outside of the range between zero and the voltage of B. When the amplified signal causes either diode to conduct, inverse feedback is applied to the junction of $R_1$ and $R_2$. The time constant of the input circuit is then $$\frac{CR_1}{1+\beta A}$$

A being the amplification factor of the amplifier 23 alone and $\beta$ the feedback ratio. In practice, $\beta$ is close to unity. This time constant during feedback may be of the order of one or a few milliseconds, so that C can charge rapidly to the full input voltage of the signal applied at 22, thereby maintaining the input to the amplifier 23 near the zero level. Hence the output in the circuit 24 is a voltage which can rise or fall rapidly regardless of the voltage level at 22 but only within the limits set by $D_1$, $D_2$ and B.

Stated another way, the amplifier has a very high gain whenever the input voltage starts to rise, but the feedback reduces the overall gain to a very low value under other conditions.

The pulse from circuit 26 is applied to a first timer 27, which may be a one-shot multi-vibrator having a short, predetermined time constant, such as 200 micro-seconds. The timer 27 applies an inhibit pulse to output 9 when circuit 26 is energized, i.e., when an increase in the input voltage in circuit 2 is detected, for the duration of the 200 micro-second period. At the end of said period a short reset pulse is transmitted as indicated at 10. (However, in the embodiment to be described, 9 and 10 are embodied by a single circuit, which carries a negative inhibit pulse and a positive such pulse.) Simultaneously with the start of the predetermined period, a pulse passes via timer output 28 to a delay unit 29, which delays transmission of the pulse to the second timer 30 by a period less than said predetermined period, e.g., 25 micro-seconds.

The second timer 30 may also be a one-shot multi-vibrator having a time constant to provide a transfer period which ends before the instant that the inhibiting pulse in circuit 9 terminates, e.g., 150 micro-seconds. During the transfer period the timer 30 energizes the circuit 14 to open the gate 12. The timer 30 emits a pulse to a start-sequence controller 31, e.g., at the start of the transfer period.

The controller 31 initiates the scanning operation by bringing into operation the sequence timer 32 which, by circuit 16, controls the stepping operations of the scanner.

A manual read-out initiator 33 may be provided to transmit a pulse to the first timer 27, having the same effect as the pulse in circuit 26. (Obviously the manual read-out pulse can be transmitted via circuit 26.)

Operation of the device is as follows:

The time-pulser 7 emits pulses at equal intervals, e.g., one every six seconds, which are counted in the time-counting section 6b of the counter; this affords a continuing indication of the retention time.

When the voltage in the system input circuit 2 rises, the rise is sensed in the differentiator sensing device 4, which applies a pulse via circuit 26 to initiate a read-out sequence. First, the one-shot multi-vibrator 27 is triggered, which inhibits the inputs to one (or both) sections of the counter for about two hundred micro-seconds. After a twenty-five micro-second delay from the triggering of multi-vibrator 27, the second multi-vibrator 30 is triggered, to open the gate 12 for a transfer period of about 150 micro-seconds. This causes the conditions of the bi-stable counting elements of the counter to be transferred simultaneously to corresponding elements in the memory device 13. At the end of the 200 micro-second period (after gate 12 is closed) the five decades in counter section 6a are reset to zero and the inhibit voltage is removed, restoring both counter sections to accumulate pulses from the converter 3 and pulser 7, respectively. The section 6b is not reset because cumulative retention time is desired at each read-out.

The input voltage in circuit 2 is converted in the voltage-to-frequency converter 3, into a series of pulses which are counted in the counter section 6a.

At the time that multi-vibrator 30 is triggered, a control element, e.g., a control tube, in the controller 31 is fired to energize the sequence timer 32 and start the operation of the scanner. This can occur at the start of the transfer period because the speed of the scanner is so low that it will not be connected to the first position until the end of this period. However, the signal to the controller 31 may be timed to occur later, e.g., at the end of the transfer period. The sequence timer drives the scanner, which samples the decades in the memory device 13 serially and transmits the information through the binary-to-decimal converter 18 to the printer 19. When the scanner has sampled the eight memory positions, it resets the controller 31, e.g., by quenching the control tube via circuit 16a, transmits a print command via circuit 20, and resets the bi-stable elements of the memory device 13 via the circuit 17a.

Counting in the restored counter 6 continues during the rise and fall of the input voltage, until the input again rises, causing a repetition of the above-described operations. It is evident that the number accumulated in section 6a and printed during the next read-out represents the time integral of one excursion.

By inhibiting the counter for only two hundred microseconds the maximum number of counts which can be lost during the inhibited period is only two counts if the transfer occurs at maximum signal level (i.e., when the converter 3 is emitting 10,000 pulses per second). However, because the two-hundred micro-second period starts before the maximum signal level is reached, usually only one or no counts will be lost.

Because the time pulses from the pulser 7 are infrequent it is not essential to inhibit the counter section 6b; no time pulse can then be lost, although an error in transmission to the memory device can occur in the rare event that the time pulse starts during the transfer period. When the section 6b is inhibited, loss of counts can be made unlikely by making the duration of each time pulse approximately 200 micro-seconds. A time pulse can then be lost only in the unlikely event that it coincides with the inhibition period.

Figure 3:
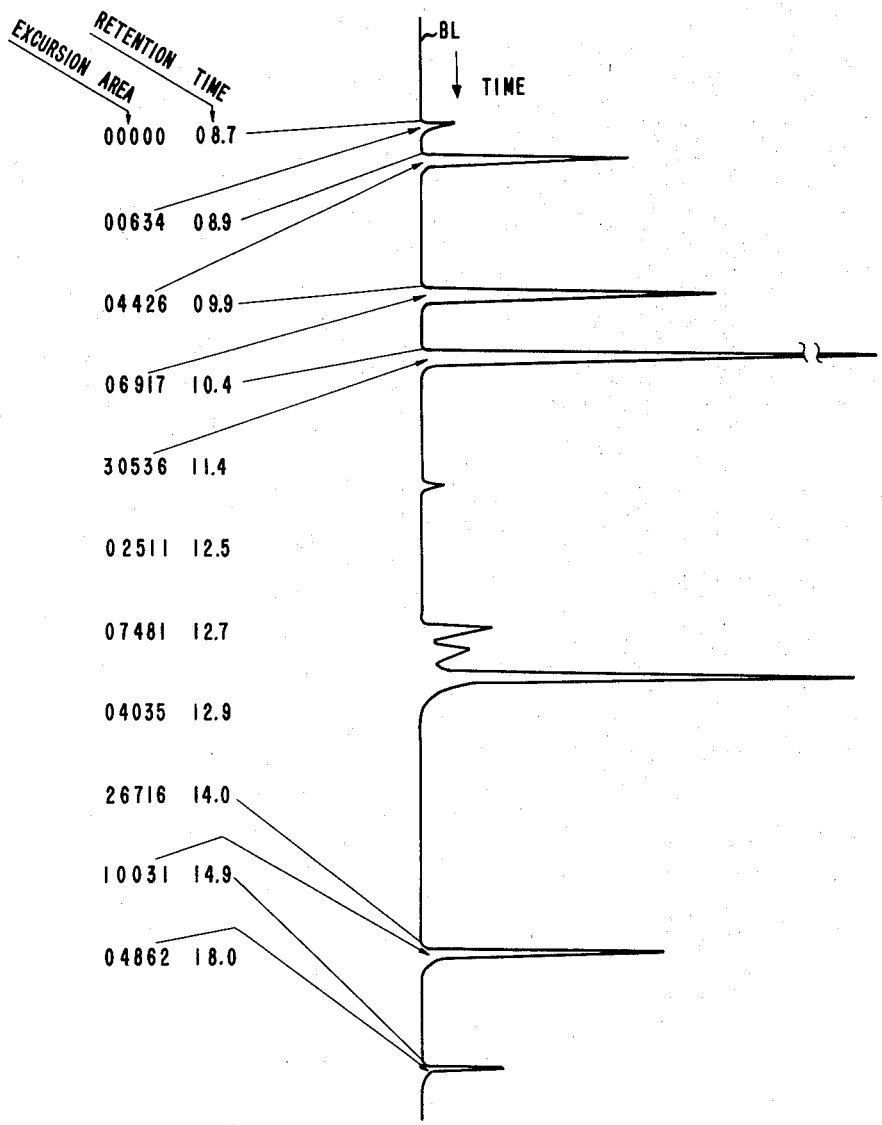
FIGURE 3 is a chromatogram showing the data which would be printed by a signal corresponding to the curve.

One embodiment of the output from the printer is indicated in FIGURE 3, which further shows a chromatogram corresponding to fluctuating data which would cause the numerical data to be printed. Increasing time is plotted downwards on the graph and the signal amplitude is plotted with increasing values to the right of the base level BL. At the start of the first excursion the time was 8.7 minutes and the counter section 6a had accumulated zero counts. Time 8.9 marks the start of the second excursion, and the count of 634 represents the area of the previous or first excursion. At the end of the run, indicated by the time 18.0 minutes, a read-out was initiated manually by the manual read-out control 33 to yield the count 4862, representing the area under the curve for the last excursion (which started at time 14.9).

In FIGURE 3 each printed time indicated the start of the excursion printed on the following line. This is in accordance with the scanning and printing mechanism to be described. However, it may be noted that the invention is not limited to such a format, and that by a simple modification in the scanner 15 each integral can be printed on the same line as the time at which it began.

The system described offers several advantages over conventional electro-mechanical integrating systems. It is especially suited for use with detectors, such as cells of capillary GLC instruments, which produce a multitude of sharp peaks, occurring in relatively short periods. The inherently high sensitivity of the system allows accurate integration of small excursions or peaks while the wide dynamic range of the converter 3 and the high counting capacity of the system allows the larger excursions to be measured at the same attenuation level as the smaller ones. Because the need for manual or automatic attentuation is eliminated, it is possible to achieve unattended, dynamic operation of the device. Since the primary signal is integrated electronically it is not necessary to provide a precision strip chart recorder. If a monitor record of the input analogue signal is desired, a less accurate and inexpensive recorder may be connected to the input circuit 2. However, since retention time automatically logged as each excursion is printed, viz., as each component retained by the GLC instrument is eluted, a recorder is not normally necessary, even to provide a time base.

The high-speed transfer of information from the counters to the memory prevents any loss of count accuracy during read-out. Since only digital information is handled in the read-out circuits, the ambiguity associated with analogue and some electromechanical integrating systems is obviated.

Following are more detailed descriptions of those compounds considered above which may not be obvious to those skilled in the art:

The differentiator amplifier

Figure 4:
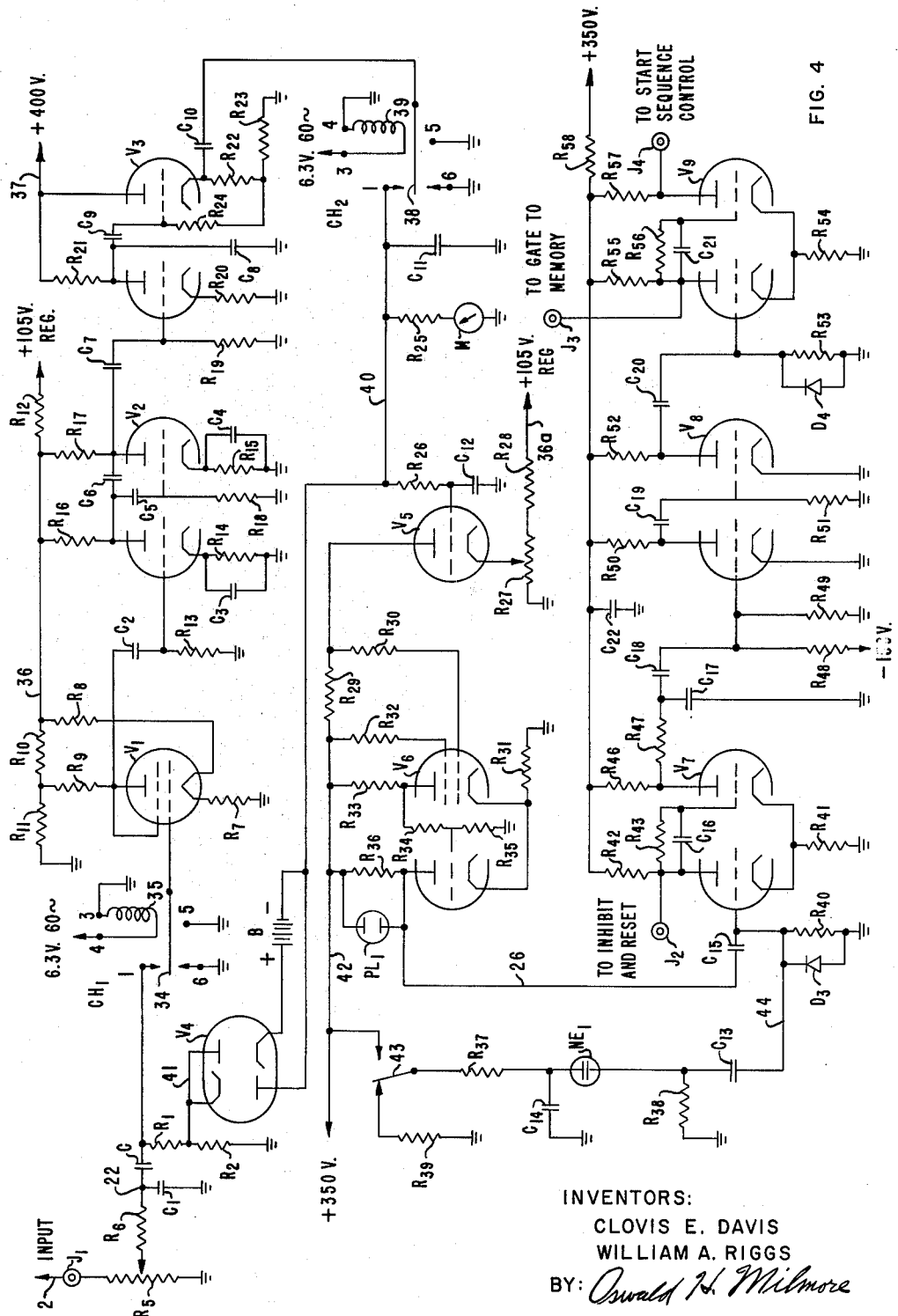
FIGURE 4 is a schematic diagram of a differentiator amplifier and timer suitable for the device.

FIGURE 4 shows, in the upper part, a differentiator amplifier used as the differentiator sensing device 4 and shown in abridged form in FIGURE 2. The input terminal $J_1$, to which the circuit 2 is connected, applies the input voltage to a grounded sensitivity-control resistor $R_5$ (10K), the movable contact of which is connected to a a low-pass filter formed by resistor $R_6$ (100K) and grounded capacitor $C_1$ (.25 mfd.). (Specific sizes and types of component of circuit elements are stated in parentheses to present one exemplary embodiment; the abbreviations K and meg. denote kilo-ohms and meg-ohms, respectively, mfd. denotes microfarads and pfd. picofarads, i.e., $10^{-12}$ farads.) The junction of the last-mentioned elements corresponds to the input 22 of FIGURE 2. The sensitivity control $R_5$ allows the input of the differentiator to be adjusted so that the noise level from the source 1 does not trigger the read-out cycle. The low-pass filter reduces the effect of hum and high-frequency noise in the source 1.

The signal at junction 22 is applied to an RC coupling amplifier input circuit consisting of C, $R_1$ and $R_2$ (1.0 mfd., 50 meg. and 220K, respectively) and, from the junction of C and $R_1$, to the input pin No. 1 of a chopper $CH_1$. The RC coupling circuit provides a long time constant (with no feedback) at the input to the chopper. The chopper (e.g., an Airpax Model "A175") includes a vibrating armature 34 which is driven by a solenoid 35 at a suitable frequency, such as 60 cycles per second, and alternately connects the control grid of tetrode $V_1$ (CK5886) to the chopper pin 1 and ground (pin 6). Thereby any signal which is impressed on the chopper pin 1 appears at the grid of $V_1$ as an A.C. signal. The tube $V_1$ is connected as an electrometer, so as to prevent loading the RC coupling circuit, since loading would reduce the time constant of the input circuit. To this end its cathode is connected to ground by a resistor $R_7$ (270 ohms) and to a source of positive voltage, in circuit 36 via resistor $R_8$ (10K), the screen grid and plate are connected through resistors $R_9$ (2.7 meg.) and $R_{10}$ (68K) to the positive voltage, and the junction between $R_9$ and $R_{10}$ is connected to a grounded resistor $R_{11}$ (22K). Resistor $R_{12}$ (1500 ohms) connects the circuit 36 to the regulated voltage source (+105 volts). The plate is further connected via coupling capacitor $C_2$ (.03 mfd.) to the input grid of the amplifier proper, which comprises both sections of $V_2'$ (12AX7) and the first section of $V_3$ (12AU7).

In the amplifier the input (left) grid is connected to a grounded resistor $R_{13}$ (1 meg.), and the cathodes to grounded cathode resistors $R_{14}$ and $R_{15}$ (each 2200 ohms) having by-pass capacitors $C_3$ and $C_4$ (50 and 100 mfd., respectively). The plates of $V_2$ are connected to circuit 36 via plate resistors $R_{16}$ and $R_{17}$ (270K and 100K, respectively). The left plate is coupled to the right grid via a coupling capacitor $C_5$ (.03 mfd.), which is further connected to a capacitor $C_6$ (2200 pfd.). The right plate of $V_2$ is coupled via a capacitor $C_7$ (.047 mfd.) to the grid of the first section of $V_3$, which is further connected to a grounded resistor $R_{19}$ (270K). The cathode of this section is connected to a grounded cathode resistor $R_{20}$ (2200 ohms) and the plate is connected to a positive voltage circuit 37 (400 volts) via plate resistor $R_{21}$ (100K). The plate output may optionally be fed through the second section of $V_3$, connected as a cathode follower. To this end, the plate is connected to a grounded capacitor $C_8$ (.01 mfd.) and to a coupling capacitor $C_9$ (.1 mfd.) which is connected to the grid of the second section, having its plate connected directly to circuit 37 and its cathode to grounded cathode resistors $R_{22}$ (470 ohms) and $R_{23}$ (47K), the junction between the latter being further connected via resistor $R_{24}$ (1 meg.) to the grid. (When the cathode follower output is not used, $C_8$ is omitted and $C_9$ corresponds to $C_{10}$.)

The amplifier has a gain of several thousand. Its output is fed via a coupling capacitor $C_{10}$ (.25 mfd.) to the vibrator 38 of a chopper $CH_2$, which functions as a demodulator, being like $CH_1$, and similarly driven at 60 cycles per second by a solenoid 39. This is powdered from the same source of A.C. power as $CH_1$, so that the vibrators 34 and 38 move synchronously. The output of $CH_2$, at its pin No. 1, is an interrupted D.C. voltage, being an amplified, inverted polarity, version of the voltage applied to pin No. 1 of $CH_1$. This voltage is applied by a circuit 40 to: a grounded capacitor $C_{11}$ (2.0 mfd.); via resistor $R_{25}$ (150K) to a meter M (50 μamp.); via resistor $R_{26}$ (1 meg.) to the grid of $V_5$ (6C4); and directly to the feedback battery B (6.5 volt) and twin diode tube $V_4$ (6AL5), which correspond to the elements B, $D_1$ and $D_2$ of FIGURE 2. The circuit 40 (which corresponds to circuit 24 of FIGURE 2) is connected directly to the plate of one section of $V_4$, the cathode of the other section being connected to B, the other cathode and plate being connected by a circuit 41 to the junction of $R_1$ and $R_2$. In other words, the voltage-dividing resistors $R_3$ and $R_4$ of FIGURE 2 are not used in this circuit. The capacitor $C_{11}$ maintains the circuit 40 at a potential which follows closely the voltages sampled by pin No. 1 of $CH_2$.

Operation of the differentiator amplifier is as follows: While the input voltage at $J_1$ is zero or constant, the input voltage at pin No. 1 of $CH_1$ and the output voltage of $CH_2$ remain zero and there is no feedback. The time constant of the input circuit is then $C(R_1+R_2)$ (about 50 seconds in the example). Any change in input voltage is applied to $CH_1$ at once and substantially at the level at which it appears at point 22; this causes an abrupt change in the amplified signal in circuit 40, due to the high gain of the amplifier. Thus, when the input signal rises, indicating the start of an excursion, the circuit 40 is driven negative.

When circuit 40 starts to become negative, neither section of $V_4$ conducts until the voltage falls to below the bias of the battery B (viz., to below −6.5 volts, in this example). Thereafter the right section of $V_4$ conducts, driving the circuit 41 negative and applying full negative voltage to $R_1$. The time constant of the input circuit to pin No. 1 of $CH_2$ is now sharply reduced to $$\frac{R_1 C}{A}$$

where A is the amplification factor of the amplifier alone. This constant is about 0.002 second (neglecting the effect of the filter $R_6$, $C_1$), so that the condenser C can charge rapidly and the input voltage at $CH_1$ is maintained at low level (typically one or two millivolts, such as to maintain the output circuit 40 at close to −6.5 volts).

When the input voltage at $J_1$ is falling, the voltage at pin No. 1 of $CH_1$ turns negative, and an amplified positive voltage appears in circuit 40; this immediately causes the left section of $V_4$ to conduct and applies positive voltage to $R_1$, again causing a short time constant and holding the input voltage to $CH_1$ close to zero volts.

When the input voltage ceases its downward travel and starts to increase either from a level above zero or from zero (but without sojourning at zero) the input voltage to $CH_1$, which was close to zero, becomes positive. At first neither section of $V_4$ conducts, and the time constant is again long, causing an abrupt negative change in the amplified voltage in circuit 40. However, as soon as the voltage in circuit 40 falls to below the bias voltage (−6.5 volts), the right section of $V_4$ conducts, resulting in the action described above.

On the other hand, when the input voltage ceases its downward travel by reaching a constant, such as zero, the input voltage to $CH_1$ becomes zero as soon as C discharges. This leads to cessation of feedback and reestablishment of the long time constant.

It is evident that there is no feedback so long as the voltage in circuit 40 is between zero and the bias voltage (−6.5 volts). Hence, whenever the input voltage at $J_1$ starts to rise at the start of an excursion, whether from a constant level or from a descending part of a prior excursion, the amplifier exhibits a very high amplification, and the particular voltage level at $J_1$ at the instant of the start of the excursion does not affect the sensitivity. However, the amplification becomes very low during descent and soon after the start of an ascent in voltage.

*The trigger circuit*

The circuit 40 feeds a triggering device, such as a conventional Schmitt trigger through $R_{26}$. The grid of $V_5$ is connected to a grounded capacitor $C_{12}$ (.047 mfd.) and the cathode is connected to a potentiometer $R_{27}$ (1500 ohms) which is connected between ground and a resistor $R_{28}$ (10K) which is connected to a circuit 36a connected to source of regulated positive voltage described for circuit 36 (+105 volts). $R_{27}$ permits the triggering level to be adjusted. The plate of $V_5$ is connected via a plate resistor $R_{29}$ (1 meg.) to a positive voltage circuit 42 (+350 volts) and coupled via a resistor $R_{30}$ (1 meg.) to the control grid of the tetrode section of $V_6$ (6BA8). Both cathodes of this tube are connected to a grounded cathode resistor $R_{31}$ (15K); the screen grid and tetrode plate are connected to circuit 42 through resistors $R_{32}$ (47K) and $R_{33}$ (22K), respectively; the said plate is connected to the triode grid through a resistor $R_{34}$ (47K), and the grid to a grounded resistor $R_{35}$ (39K). The triode plate is connected via a plate resistor $R_{36}$ (15K) to the circuit 42 and to an output circuit 26 (which is indicated in FIGURES 1 and 2). A neon pilot light $PL_1$ may be connected in shunt with $R_{36}$ to indicate when the triode section of $V_6$ is conducting.

$V_5$ normally conducts. When circuit 40 is driven negative, $V_5$ is cut off, resulting in a positive pulse on the first grid of $V_6$ and producing a sharp positive pulse in the output circuit 26. This initiates a read-out cycle, as will appear. $R_{27}$ is adjusted to trigger $V_6$ when circuit 40 is about −3.5 volts (going negative). Once $V_6$ is triggered it cannot be triggered again until the output of $CH_2$ drops to approximately −3 volts. This space or "hysteresis" between the trigger and reset of $V_6$ is necessary to prevent slight noise which may accompany the input signal from producing multiple triggering.

*Manual read-out control*

The manual read-out control, indicated at 33 in FIGURE 1, comprises (FIGURE 4) a switch 43 which normally connects an output circuit 44 via a resistor $R_{37}$ (1 meg.), a neon tube $NE_1$, and a capacitor $C_{13}$ (390 pfd.) to a grounded resistor $R_{39}$ (220 K). A grounded capacitor $C_{14}$ (.01 mfd.) is connected to the junction of $NE_1$, and $R_{37}$; and a grounded resistor $R_{38}$ (100K) is connected to the junction of $NE_1$ and $C_{13}$. When the switch 43 is operated it connects the resistor $R_{37}$ to the circuit 42 to apply a short positive pulse to the circuit 44.

*The first timer*

The first timer is a one-shot multi-vibrator comprising a tube $V_7$ (12AT7) the left grid of which is coupled to the circuit 26 through a capacitor $C_{15}$ (100 pfd.) and connected further to the circuit 44 and to a grounded resistor $R_{40}$ (220K). A diode $D_3$ shunts the latter, to prevent negative drift of the grid. The cathodes are connected to a common grounded resistor $R_{41}$ (2200 ohms). The left plate is connected to an output terminal $J_2$ (which is connected to the inhibit and reset terminal on the counter) and coupled to positive voltage circuit 45 through a plate resistor $R_{42}$ (10K) and to the grid of the right section via a resistor $R_{43}$ (1 meg.) and a capacitor $C_{16}$ (.005 mfd.). The right plate (which corresponds to output 28 at FIGURE 1) is coupled to circuit 45 by a plate resistor $R_{46}$ (15K) and to a coupling resistor $R_{47}$ (47K) which is further connected to a grounded capacitor $C_{17}$ (.0068 mfd.) and a coupling capacitor $C_{18}$ (.001 mfd.).

Normally the left section of $V_7$ is cut off and the right section is in a state of heavy conduction due to the positive bias on $R_{43}$. When a positive pulse is received from circuit 26 or 44 a single negative pulse of approximately 200 micro-seconds duration is produced at $J_2$ (to inhibit the counter) and a positive pulse of the same duration appears at the plate of the right section. The latter is transmitted to the delay unit. At the end of the 200 microsecond period the right section again begins to conduct and the left section cuts off; this produces a positive pulse at $J_2$ which resets section 6a of the counter. It is evident that the inhibit and reset pulses, indicated by separate lines in FIGURE 1, are in this embodiment transmitted over the same circuit.

The delay unit

The positive pulse from the right plate of $V_7$ is transmitted via the coupling elements $R_{47}$ and $C_{18}$ to the left grid of $V_8$ (12AT7) which grid is connected through a resistor $R_{48}$ (2.7 meg.) to a source of negative voltage (−150 v.) and to a grounded resistor $R_{49}$ (270K). Both cathodes are grounded. The left plate is connected through a plate resistor $R_{50}$ (10K) to the circuit 45 and coupled through a capacitor $C_{19}$ (.004 mfd.) to the right grid, which is further connected to a grounded resistor $R_{51}$ (1 meg.). The right plate is connected to circuit 45 through a plate resistor $R_{52}$ (100K) and coupled to the left grid of $V_9$ (12AU7) through a coupling capacitor $C_{20}$ (10 pfd.).

The circuit elements from $R_{47}$ to $C_{20}$ isolate $V_9$ from $V_7$ and cause a delay. The left section of $V_8$ is normally biased beyond cutoff (to about −15 v.) through $R_{43}$ and $R_{49}$ and the positive pulse voltage from $V_7$ must rise to the level where $V_8$ starts to conduct before a signal appears on the plate of the left section of the latter. Since $R_{47}$ is in series and $C_{17}$ is shunting, the signal is delayed and conduction in the left side of $V_8$ does not begin until approximately 25 micro-seconds after the positive pulse is generated at the right plate of $V_7$. The right side of $V_8$ serves to invert and amplify so as to produce a fast-rising positive pulse at $C_{20}$.

The second timer

The second timer is another one-shot multi-vibrator comprising the tube $V_9$, the left grid of which is connected to a grounded resistor $R_{53}$ (100K) which is shunted by a diode $D_4$ to prevent negative drift of the grid. The cathodes are connected to a common grounded resistor $R_{54}$ (2200 ohms). The left plate is connected to output terminal $J_3$ (which is connected to the circuit 14 of FIGURE 1 to open the gate 12) and to the circuit 45 through a plate resistor $R_{55}$ (10K) and coupled to the grid of the right section via a resistor $R_{56}$ (1 meg.) and a capacitor $C_{21}$ (.005 mfd.). The right plate is connected to circuit 45 through a plate resistor $R_{57}$ (15K) and to output terminal $J_4$ (which is connected to the start-sequence control 31 of FIGURE 1).

Normally the left section of $V_9$ is cut off and the right section is in a state of heavy conduction due to the positive bias on $R_{56}$. Operation is similar to the first timer. The delayed pulse from the right plate of $V_8$ is differentiated by $C_{20}$ and $R_{53}$, producing a short positive trigger pulse to the left grid of $V_9$. This provides a negative pulse of about 150 micro-seconds duration at $J_3$ to open the gate to circuits 11 (of FIGURE 1). Simultaneously with the negative gate pulse, a positive pulse is produced at $J_4$ to initiate the start sequence operation, to be described.

The time periods of 200 and 150 micro-seconds are determined principally by the resistors $R_{43}$ and $R_{56}$ and the capacitors $C_{16}$ and $C_{21}$; however, they are also influenced by other circuit elements and the pulse heights. It is for this reason that the two timers have different periods while the above-mentioned resistors and capacitors are alike.

The circuit 45 is preferably connected through a resistor $R_{58}$ (5K) to a source of positive voltage (+350 volts) and is further connected to a grounded buffer condenser $C_{22}$ (40 mfd.).

The counter inhibit and reset controls

Figure 5:
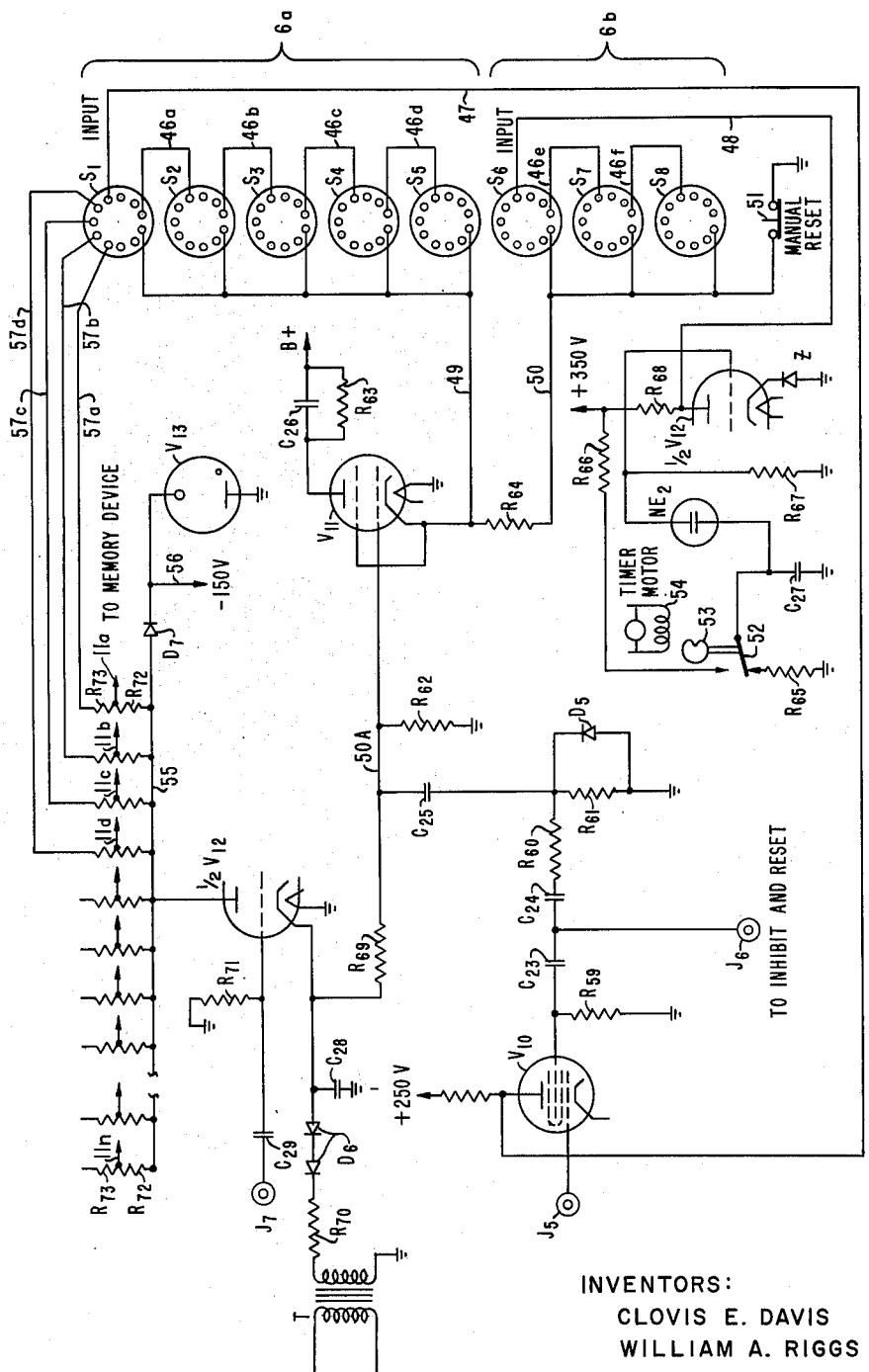
FIGURE 5 is a schematic diagram of certain elements of the counter and the gate for transferring data to the memory unit.

Certain elements of the counter 6 are shown in FIGURE 5 which is only fragmentary because counters are known per se. $S_1$–$S_8$ represent sockets for electronic decade counting units, each unit having four bistable elements. $S_1$–$S_5$ constitute the integral-counting sections 6a and the other three the time-counting section 6b. The decade units within each section are interconnected by carry-over circuits 46a, 46b, etc. A separate input circuit 47 or 48 is provided for each section and connected to the respective low-order counting unit. 49 and 50 are re-set circuits, connected to the units of the respective sections, by which a positive reset pulse can be applied.

$J_5$ is an input jack (connected to the circuit 5 of FIGURE 1) and is connected (through suitable coupling elements, not shown) to the control grid of a gate tube $V_{10}$ (6BE6), the plate of which is coupled to the input circuit 47 to transmit negative count pulses to the input of counting unit in $S_1$. The second control grid of $V_{10}$ is connected to a grounded resistor $R_{59}$ (470K) and coupled to a jack $J_6$ through a coupling capacitor $C_{23}$ (.022 mfd.). ($J_6$ is connected to $J_2$ of FIGURE 4.) $V_{10}$ normally acts as a pulse amplifier, permitting pulses from the voltage-to-frequency converter at $J_5$ to be amplified and applied to $S_1$ via circuit 47. When a read-out cycle is initiated, a negative pulse from $J_2$ of the first timer is applied via $J_6$ and $C_{23}$, which cuts off $V_{10}$. This prevents any signals from $J_5$ from reaching the counters during the 200 microsecond inhibit period.

$J_6$ is further connected to a capacitor $C_{24}$ (.0022 mfd.) which is connected to a resistor $R_{60}$ (10K). The latter is connected to a grounded resistor $R_{61}$ (1 meg.) which is shunted with a diode $D_5$ and to a capacitor $C_{25}$ (.01 mfd.). The diode $D_5$ prevents the lower side of $C_{25}$ from going negative when the inhibit pulse is applied to $J_6$ and causes $C_{24}$ to charge. However, the positive pulse applied to $J_6$ at the end of the inhibit period is transmitted to a circuit 50A, which is connected to a grounded resistor $R_{62}$ (680K), and the control grid of a thyratron $V_{11}$ (2D21) having the plate connected to positive voltage B+ via a resistor $R_{63}$ (1 meg.), which is shunted by a capacitor $C_{26}$ (.022 mfd.). The cathode and second grid are connected to the reset circuit 49 and further, via a resistor $R_{64}$ (47 ohms) to the circuit 50. The latter is normally connected to ground through a normally closed manual reset switch 51. Normally $R_{62}$ (together with $R_{69}$, to be described) provides sufficient negative bias to circuit 50A to keep $V_{11}$ from firing. However, when the positive reset pulse is applied, $V_{11}$ fires and charges $C_{26}$ through $R_{64}$. The charging current develops in $R_{64}$ a very short positive pulse which is applied to circuit 49 to reset the first five decade counters. Switch 51, being closed, prevents the last three decades from being reset by maintaining the circuit 50 at ground potential. When $C_{26}$ charges, the voltage on the plate of $V_{11}$ drops and the tube deionizes.

All eight decades are reset manually by opening the switch 51, allowing internal circuits in the decade counters to raise the voltage in circuits 49 and 50 to reset potential.

It may be observed that the gate tube $V_{10}$ in this embodiment inhibited only the first five decades of the counter. This is not, however, restrictive of the invention.

The time-interval pulser

FIGURE 5 further shows the time-interval pulser 7 of FIGURE 1. It comprises a single-pole, double-throw switch 52 operated by a cam 53 which is driven by an electric motor 54 at a suitable speed, e.g., ten turns a minute. For most of the cycle the switch connects a neon tube $NE_2$ and a grounded capacitor $C_{27}$ (.1 mfd.) to a grounded resistor $R_{65}$ (1 meg.), causing $C_{27}$ to discharge. Once each revolution it connects the former elements through resistor $R_{66}$ (10 meg.) to a source of positive voltage (250 volts), causing $C_{27}$ to charge. When $C_{27}$ reaches firing potential, $NE_2$ fires, producing a positive pulse (15 volts) on the right grid of $V_{12}$ (12AT7), which is connected to a grounded resistor $R_{67}$ (150K). This tube has its right cathode connected to ground through a voltage-regulating Zener diode Z which limits the positive potential of the cathode to 8 volts, and its right plate connected to the said positive voltage through a resistor $R_{68}$ (1 meg.) and to the count input circuit 48. This section is normally biased almost to cutoff. When the positive pulse is applied to the grid of $V_{12}$, the section conducts, and a negative count-pulse is applied to circuit 48.

Gate to transfer-circuits

The circuit 50A is further connected via resistor $R_{69}$ (20 meg.) to the cathode of the left section of $V_{12}$, to a grounded buffer condenser $C_{28}$ (30 mfd.) and to serially connected diodes $D_6$. The latter are connected through a resistor $R_{70}$ to the grounded secondary of a power transformer T. It is evident that a negative bias from the rectifier $D_6$ is thereby applied to circuit 50A, as well as to the left cathode of $V_{12}$ (making the cathode −300 volts). The left grid of $V_{12}$ is connected to $J_7$ (which is connected to $J_3$ of FIGURE 4) through a coupling capacitor $C_{29}$ (.01 mfd.) and directly to a grounded resistor $R_{71}$ (10 meg.). The plate is connected to a circuit 55 to which is connected the anode of a diode $D_7$, the cathode of which is connected to a source of negative voltage in circuit 56 (e.g., −150 volts) and to a plate-grounded voltage-regulating tube $V_{13}$ (e.g., 0A2).

Connected to the circuit 55 are thirty-two voltage dividers, each comprising a pair of resistors $R_{72}$ (1.5 meg. to 1.8 meg.) and $R_{73}$ (1.0 meg.), the latter resistors being connected to different bi-stable elements of the counter, e.g., to the plates of the counter tubes as indicated by the circuits 57a, 57b, etc. for the first decade. Each output circuit 11 leading to the memory device is connected to the junction between a pair of these resistors.

For simplicity, the operation of the gate will be described with reference to the specific voltages and components given in the example, it being further assumed that the voltage at the counter plates are about +100 volts when the counter tubes are conducting and about +200 volts when not conducting. The circuit 55 is normally at about −250 volts, due to the heavy conduction through the left section of $V_{12}$, caused by positive bias through $R_{71}$. The diode $D_7$ does not conduct when its anode is more negative than −150 volts. Hence the output circuits 11 cannot assume any voltage higher than −25 volts, being about −25 and −75 volts when the circuits 57 are at +100 and +200 volts, respectively. The thyratrons in the memory unit cannot fire, because they require a voltage higher than −6 volts for this action. Hence the gate is effectively closed.

Upon receipt of a negative gate pulse at $J_7$, the left section of $V_{12}$ is cut off, causing the voltage in the circuit 55 to rise to the level of circuit 56, viz., −150 volts. The voltages in the output circuits 11 now become either +25 or −25 volts, respectively, for the non-conducting and conducting conditions of the counter tubes. This will fire those thyratrons in the memory device which correspond to non-conducting counter tubes. The gate 12, therefore, is open for the duration of the short negative gate pulse.

The memory device

Figure 6:
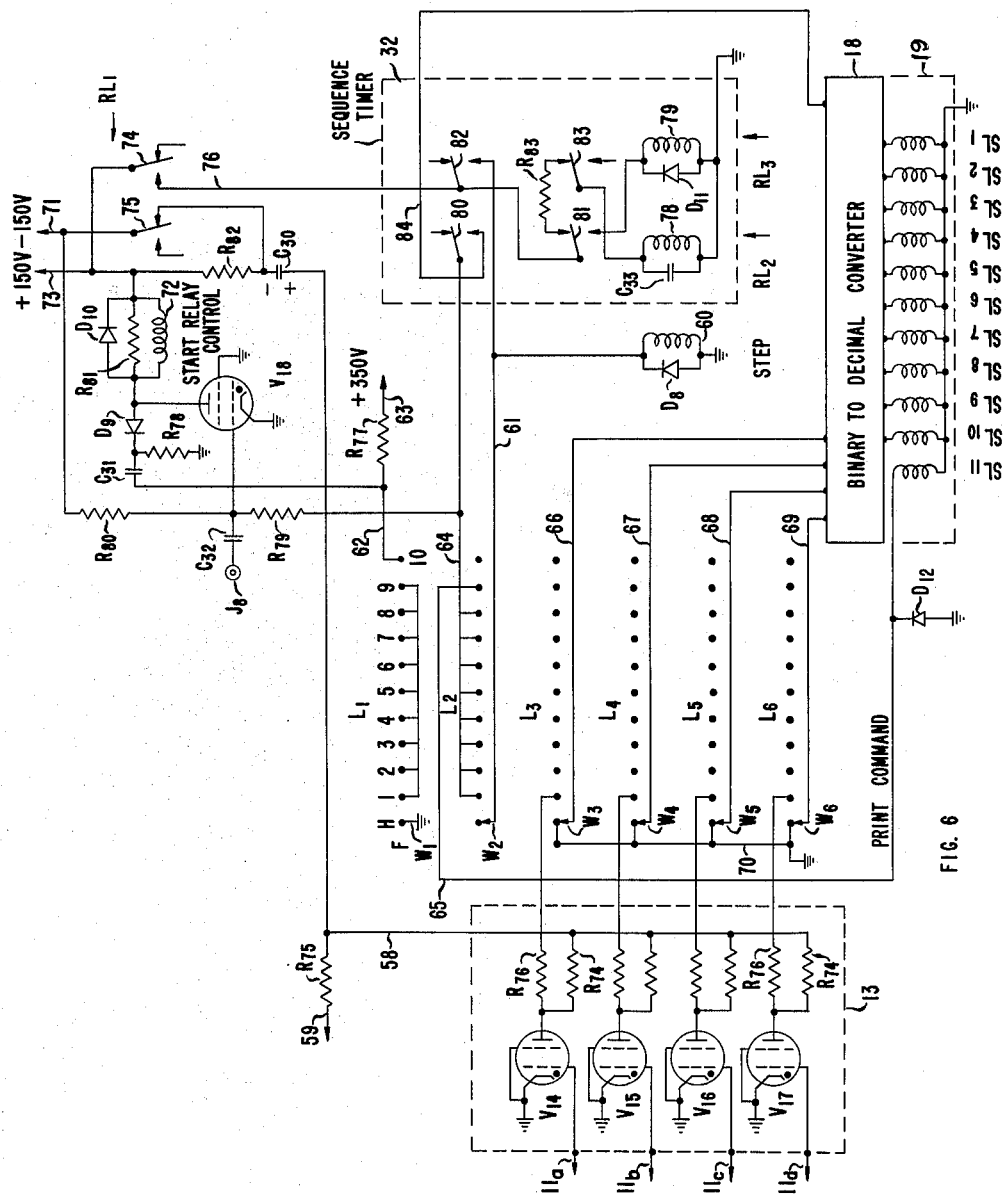
FIGURE 6 is a schematic diagram of parts of the memory unit, start-sequence control, sequence timer, scanner and printer.

Referring to FIGURE 6, the memory unit 13 includes principally a plurality of bi-stable elements, such as a memory thyratron tube for each bi-stable element of the counter. In the example, the information is stored in binary-coded decimal and four such tubes are needed in each decade. Hence the memory includes thirty-two thyratrons, of which only four, $V_{14}$–$V_{17}$ (2D21) are shown, these being for the first decade. Each said tube has its control grid connected to a separate connecting circuit 11a, 11b, etc., and has its second grid and cathode grounded. Each plate is connected to a separate plate resistor $R_{74}$ (68K) which is further connected to a common plate circuit 58 to which positive voltage is applied from a source circuit 59 (+150 volts) through a resistor $R_{75}$ (10K). This resistor permits the potential in the circuit 58 to be lowered via capacitor $C_{30}$ (10 mfd.) in a manner to be described for extinguishing the fired tubes. Each memory thyratron plate is further connected through a separate read-out resistor $R_{76}$ (.47 meg.) to a corresponding contact of a scanner, to be described.

When the gate in transfer circuits 11 is opened by a gate pulse at $J_7$ of FIGURE 5, the control grids of the memory thyratrons receive a positive pulse (+25 volts) and fire when the corresponding plate in the counter 6 is not conducting and are at a negative voltage (−25 volts) and hence do not fire when the corresponding plate in the counter is conducting. The tubes thereby store the data from the counter and can be interrogated by the scanner to be described. Because all thirty-two circuits 11 are gated simultaneously, a very rapid transfer of numerical information is effected.

The scanner

The scanner shown in FIGURE 6 comprises a stepping switch having six levels $L_1$–$L_6$, and a wiper $W_1$–$W_6$ for each level. The switch may be of any known type having at least a home position and a plurality of off-home positions at least two greater than the number of decades in the counter, e.g., at least one home position H and ten additional positions, as shown. The switch to be described by way of example is of the type wherein the wipers, moving in unison, reach home position when advancing one step beyond the last off-home position. The switch has a stepping solenoid 60, which may be shunted by a diode $D_8$, connected between ground and a control circuit 61, which solenoid, when energized, advances a pawl against the action of a spring and, when de-energized, permits the spring to retract the pawl to advance the wipers. Because such switches are known no further description is given.

In the drawing all wipers are shown in their home positions. Wiper $W_1$ is grounded. In level $L_1$ the home contact is open; contacts 1 through 9 are interconnected (or may be left open); and contact 10 is connected by a circuit 62 to one terminal of a resistor $R_{77}$ (220K) and to a capacitor $C_{31}$ (.25 mfd.). The other terminal of $R_{77}$ is connected to a circuit 63 to which positive voltage (+350 volts) is supplied. The other terminal of $C_{31}$ is connected to a grounded resistor $R_{78}$ (100K) and the cathode of a diode $D_9$, the anode of which is connected to the plate circuit of the "Start Sequence" control tube $V_1$ (2D21) to be described.

Wiper $W_2$ is connected to circuit 61. In $L_2$, the home contact is open; contacts 1–8 are connected to a common circuit 64; contact 9 to a circuit 65 leading to the print solenoid $SL_{11}$ in the printer (to be described); and contact 10 is open.

Wipers W3, W4, W5 and W6 are connected by circuits 66, 67, 68, and 69, respectively, to the binary-to-decimal code converter 18 which, being well known, is not further described herein. The home contacts of levels $L_3$ through $L_6$ are connected to a common grounded circuit 70. The contacts number 1 of these levels are connected, respectively, to the read-out resistors $R_{76}$ of the four memory thyratrons corresponding to the first digit, as shown. Similarly, the contacts number 2 are connected to the read-out resistors of the four memory thyratrons of the second digit, and so through contacts number 8; these connections are not shown, for clarity. The last two contacts are not wired.

It will be seen that when the wipers are in home position, circuits 66–69 are grounded while the terminal of circuits 61, 62 and 64 at the scanning switch are open. When the wipers advance step by step through positions 1 through 8, circuits 61 and 64 are interconnected; further, circuits 66–69 are connected, in succession, to groups of four read-out resistors $R_{76}$ to sample the voltages present at the plates of the memory thyratrons. In position 9 the circuit 65 is connected to circuit 61. In position 10 circuit 62 is grounded.

*The start-sequence controller*

$V_{18}$ is the control tube in the start-sequence controller 31 of FIGURE 1. Referring to FIGURE 6, the control grid of $V_{18}$ is coupled via a capacitor $C_{32}$ (50 pfd.) to an input terminal $J_8$ (which is connected to $J_4$ of FIGURE 4); through resistor $R_{79}$ (470K) to the circuit 64; and through resistor $R_{80}$ (2.7 meg.) to a circuit 71 to which a negative voltage (−150 volts) is supplied. The cathode and second grid of $V_{18}$ are grounded. The plate is connected, in addition to the diode, to one terminal of a relay solenoid 72 the other terminal of which is connected to a circuit 73 to which a positive voltage (+150 volts) is supplied. This solenoid is shunted by a resistor $R_{81}$ (10K) and a diode $D_{10}$, to carry surge current upon de-energization.

The solenoid 72 controls the two armatures 74 and 75 of relay $RL_1$, which are connected to the circuits 71 and 73, respectively and are normally in the positions shown. The make-contact of armature 74 is connected to a circuit 76 which controls the sequence timer, the back-contact being open. The make-contact of armature 75 is open and the back-contact is connected to the junction of a resistor $R_{82}$ (68K) and the capacitor $C_{30}$. The other end of $R_{82}$ is connected to the circuit 73.

The control thyratron $V_{18}$ is normally non-conducting, due to negative bias through $R_{80}$. When a positive pulse is applied to $J_8$, $V_{18}$ fires, drawing current through the solenoid 72 and operating the relay $RL_1$. This applies a positive voltage to the control circuit 76 of the sequence timer via the armature 74. The negative voltage via armature 75 is now removed from $C_{30}$, whereby the latter discharges through $R_{82}$.

The voltage on control circuit 76 starts the stepping of the scanner, as will appear. When the wiper $W_1$ reaches the tenth position it grounds the circuit 62. The capacitor $C_{31}$ having previously been charged (to about 350 volts) now draws current through $D_9$ and applies a large negative pulse to the plate of $V_{18}$, causing the tube to deionize. The relay $RL_1$ now drops out, de-energizing the control circuit 76 and stopping operation of the sequence timer. Further, armature 75 applies a negative voltage to $C_{30}$, which was substantially discharged while $RL_1$ was operated. This applies a negative pulse to the circuit 58, which acts through the resistors $R_{74}$ on the plates of the memory thyratrons $V_{14}$–$V_{17}$, etc., to deionize them and thereby restore the memory unit for another transfer operation.

It may be noted that during the first eight steps of the scanning, the negative grid bias on $V_{18}$ is lowered through $R_{79}$ from circuit 64 (as will appear) to the point at which the tube will fire to operate $RL_1$. This is to insure that when the unit is first turned on, it will not stop in the middle of a cycle and burn up a solenoid. Hence $V_{18}$ will fire whenever the scanner leaves home position, even without a pulse from $J_8$.

*The sequence timer*

The sequence timer 32 of FIGURE 1 is shown in FIGURE 6. It includes a pair of relays $RL_2$ and $RL_3$, having grounded operating solenoids 78 and 79, respectively, shunted by a capacitor $C_{33}$ (4 mfd.) and a diode $D_{11}$, respectively. Solenoid 78 controls armatures 80 and 81, and solenoid 79 controls armatures 82 and 83; all armatures are shown in their normal positions. By virtue of $C_{33}$ $RL_2$ has delayed operation and release characteristics. The control circuit 76 is connected to armatures 81 and 82, and circuit 64 to armature 80. Armature 83 is connected to the ungrounded terminals of solenoid 78 and capacitor $C_{33}$. The back-contact of armature 80 is open and its make-contact is connected via a circuit 84 to the control input of the converter 18. The back-contact of armature 81 is connected through a resistor $R_{83}$ (10K) to the back-contact of armature 83, the make-contact of the latter being open. The make-contact of armature 81 is connected to the ungrounded terminals of solenoid 79 and the diode $D_{11}$. The back-contact of armature 82 is open and its make-contact is connected to the circuit 61.

*The converter and printer*

The converter 18, as previously indicated, is any suitable device for converting the binary coded information from the circuits 66–69 into decimal notation. In the embodiment shown it has a control input to which circuit 84 is connected, and ten outputs which are connected respectively to ten grounded character-control solenoids $SL_1$–$SL_{10}$ of a printer. When circuit 84 is energized the converter emits a pulse to that one of the ten solenoids which corresponds to the converted decimal digit. The printer includes, further, a grounded eleventh or print solenoid $SL_{11}$, which is connected to the circuit 65 (corresponding to circuit 20 of FIGURE 1). A diode $D_{12}$ is preferably connected in shunt with $SL_{12}$ (similar diodes being provided for the other ten diodes but not shown because assumed to be included within the converter). When any of solenoids $SL_1$ to $SL_{10}$ is energized a character is selected in one printing position and the printer mechanism shifts one position to the left, so that the next energization of one of these solenoids selects the character to be printed in the next digit position. When solenoid $SL_{11}$ is energized one line of numbers is printed, the character selection mechanism is reset and the printer is in condition to select a character for the low-order position.

*Operation of the scanner, start-sequence controller and sequence timer*

When $RL_1$ is operated to apply a positive voltage on control circuit 76, current flows through armature 81, $R_{83}$, armature 83, and capacitor $C_{33}$. As soon as this capacitor has charged sufficiently to permit current to flow through solenoid 78, $RL_2$ operates. This switches the current from armature 81 to solenoid 79, operating $RL_3$ immediately; $RL_2$ is held for a short time by $C_{33}$. As long as $RL_2$ is held by current from $C_{33}$, $RL_3$ remains operated by current through armature 81. When $C_{33}$ is discharged sufficiently to cause $RL_2$ to drop out, solenoid 79 becomes de-energized and drops out rapidly; however, this movement of the armature 81 again causes current to flow via $R_{83}$ and armature 83 to capacitor $C_{33}$ to operate $RL_2$, again after a delay period. This cycle of operations continues so long as circuit 76 remains energized, and controls the stepping of the scanning switch. When circuit 76 is de-energized $RL_2$ and $RL_3$ both return to their normal positions.

Recapitulating, each cycle of operations is:
(1) $C_{33}$ charges.
(2) $RL_2$ operates.
(3) $RL_3$ operates.
(4) $C_{33}$ discharges through solenoid 78.
(5) Both $RL_2$ and $RL_3$ drop out.

During steps 3 and 4 positive voltage from control circuit 76 is applied via armature 82 and circuit 61 to the stepping solenoid or "motor" 60 and to the wiper $W_2$. Energization of solenoid 60 advances the pawl against its spring but does not yet advance the wipers. During step 5 the positive voltage is removed from circuit 61 and the pawl advances the wipers one step. Hence the wipers are advanced one step during each cycle of operation of $RL_2$ and $RL_3$. Application of positive voltage to circuit 61 applies a positive pulse to the grid of tube $V_{18}$ through $R_{79}$ to insure firing of said tube when wiper $W_2$ is in any of the first eight off-home positions, as was noted above.

During the second cycle of operation (with the wipers initially in the No. 1 position) the voltage from circuit 61 and $W_2$ is applied via circuit 64 to armature 80. This is transmitted via circuit 84 to the converter 18 to operate the latter and cause a conversion of the binary data from the four memory tubes sampled by the first positions of levels $L_3$–$L_6$. This information is transmitted via circuits 66–69 and converted to decimal notation, producing an output pulse at one of its ten decimal outputs. This causes the converter to energize one of the ten selector or control $SL_1$–$SL_{10}$ in the printer, to select a character for printing in the units position. In step 5 of the cycle this voltage is removed, the wipers advance to No. 2 position, and a third cycle of operation occurs, during which the character for the next printing position is similarly selected.

The above cycle is repeated until the wipers reach position No. 9. All eight digits of information from the memory unit have now been entered in the printer, and during this cycle the positive pulse from circuit 61 is applied not to the circuit 84 but to the circuit 65, which energizes the "print" solenoid $SL_{11}$ in the printer. This causes printing of one line of data, as illustrated in FIGURE 3.

When, in the next cycle, the wipers reach position No. 10, the circuit 62 is grounded by wiper $W_1$, causing the control tube $V_{18}$ to be deionized, as was described above. This causes $RL_1$ to drop out to remove positive voltage from the control circuit 76. However, before $RL_1$ drops out another cycle of the relays $RL_2$ and $RL_3$ has begun and continued at least through step 3, and the pawl of the stepping switch has advanced. When the voltage in circuit 76 is removed the pawl advances the wipers to home position, and the scanner is in starting condition for performing another read-out operation.

When the wipers are in home position the circuits 66–69 are grounded through circuit 70. This is for the purpose of keeping the input tubes in the converter cut off and preventing them from drawing current when not needed.

As was previously noted, the invention is not restricted to the illustrative embodiment shown. For example, as previously noted, the arrangement of the numbers shown in FIGURE 3 may be altered to print the retention time on the same line as the count for the excursion which started with the printed time, by a rearrangement of the positions on the scanning switch. For example, by using positions 1 through 5 for the integral count, connecting the print circuit 65 to the sixth position of $L_2$, and using positions 7, 8 and 9 for the retention time, the data of FIGURE 3 would appear as follows: On the first line only the count "00000" would appear. On the next line the number "00634" followed by the number "8.7" would appear. It is evident that still other re-arrangements of the printing format are possible.

We claim as our invention:
1. An integrator-digitizer for fluctuating data which comprises:
  (a) a voltage-to-frequency converter adapted for connection to a source of a signal of varying voltage for generating electrical pulses at a rate determined by the voltage of said signal,
  (b) a counter having a plurality of digit positions connected to said converter for counting said pulses,
  (c) a memory unit having a digit position corresponding to each digit position of the counter and connected thereto by a plurality of circuits, there being at least one said circuit for each said digit position of the counter,
  (d) gating means for the transfer of data from the counter to the memory unit simultaneously via said connecting circuits,
  (e) differentiator sensing means, said sensing means including an RC network and a differentiator amplifier means, the input of said differentiator amplifier means being coupled to said RC network, said differentiator amplifier means detecting the start of a change in said signal voltage in a predetermined direction,
  (f) control means responsive to said sensing means for operating said gating means to transfer data to the memory unit upon detection of said start, and
  (g) means for recording the data in the memory unit following each transfer of data thereto.

2. An integrator-digitizer as defined in claim 1 wherein said sensing means (e) includes a differentiator amplifier having:
  (a) an input circuit comprising an RC network which includes an input point and has a long time constant,
  (b) amplifier having the input thereof coupled to said RC network so as to place the network capacitor between said input point and the amplifier,
  (c) a negative feedback circuit connected from the output of said amplifier and to said RC network to place at least a portion of the network resistance in the feedback path to reduce said time constant, and
  (d) means in said feedback circuit for preventing feedback when the amplifier output falls within a predetermined range of voltages while permitting feedback at output voltages above and below said range.

3. In combination with the integrator-digitizer according to claim 2, trigger means connected to the output of said amplifier and to said control means for transmitting to the control means a pulse when the amplifier output voltage attains a predetermined level.

4. An integrator-digitizer as defined in claim 1 wherein said sensing means (e) includes a differentiator amplifier having:
  (a) an input circuit comprising an RC network which has a long time constant and has a capacitor between input and output points,
  (b) a high-gain D.C. amplifier having its input connected to said network output point, and
  (c) a negative feedback circuit connected from the output of said amplifier to said RC network to apply feedback through a resistor of said input network and thereby reduce said time constant, said feedback circuit comprising:
    (1) first unidirectional current flow means permitting feedback only in one direction and biased against current flow, and
    (2) second unidirectional current flow means permitting feedback in only the opposite direction.

5. An integrator-digitizer as defined in claim 1 wherein said sensing means (e) includes a differentiator amplifier having:
  (a) an input circuit comprising an RC network which has a long time constant and has a capacitor between input and output points, (b) a high-gain D.C. amplifier having its input connected to said network output, and (c) a negative feedback circuit connected from the output of said amplifier to said RC network to apply feedback through a resistor of said input network and thereby reduce said time constant, said feedback circuit including two branches of which (1) the first contains a unidirectional current flow element biased against current flow for permitting feedback in one direction when the amplified voltage exceeds the bias, and (2) the second includes a unidirectional current flow element permitting feedback in the opposite direction.

6. An integrator-digitizer for fluctuating data which comprises:

(a) a voltage-to-frequency converter adapted for connection to a source of a signal of varying voltage for generating electrical pulses at a rate determined by the voltage of said signal, (b) a resettable counter having a plurality of digit positions connected to the output of said converter for counting said pulses, (c) a memory unit having a digit positioned for each position of the said counter and connected thereto by a plurality of connecting circuits, there being at least one separate connecting circuit for each said digit position of the counter, (d) normally closed gate means for said connecting circuits for the transfer of data simultaneously via said connecting circuits when said gate means is open, (e) differentiator sensing means for detecting the start of a change in said signal voltage in a predetermined direction, (f) control means responsive to said sensing means for (1) inhibiting the reception of pulses by said counter for a short predetermined period commencing at said start of the detected voltage change, (2) opening said gate means while the counter is inhibited to transfer data from said counter to the memory unit, and (3) resetting said counter at the end of said period, and (g) means for recording the data in the memory unit following each transfer of data thereto.

7. An integrator-digitizer as defined in claim 6 wherein said control means (f)(1) includes a first timer for determining said predetermined time period and said control means (f)(2) includes a second timer for opening said gate only during a transfer period which starts after and terminates before the end of said predetermined time period.

8. An integrator-digitizer as defined in claim 6 wherein said recording means (g) includes:

(a) a record-issuing device, including character-control elements for selecting characters for different digit positions of a record, (b) a scanner for scanning the digit storage positions of said memory unit sequentially and transmitting the data of each said storage positions sequentially to and setting the said character-control elements, (c) means for initiating operation of the scanner after the opening of said gate means, and (d) means for operating the record-issuing device at the end of the scanning operation.

9. In combination with the integrator-digitizer as defined in claim 6:

(a) a time-pulse emitter for emitting a sequence of electrical time pulses at equal time intervals, and (b) a time-counter connected to said emitter for counting said time pulses, (c) said memory unit having a separate digit position for each digit position of said time-counter and being connected thereto by an additional separate connecting circuit for each said digit position and controlled by normally closed gate means, and, (d) said control means (f)(2) being adapted to open the said gate means which control said additional circuits as specified for the first-mentioned counter and connecting circuits.

10. An integrator-digitizer for fluctuating data which comprises:

(a) an input circuit adapted to be connected to a source of a signal having varying voltage, (b) a voltage-to-frequency converter connected to said input circuit for generating electrical pulses at a frequency proportional to said voltage, (c) a time-pulse emitter for emitting a series of electrical time pulses at equal time intervals, (d) an electronic counter including:

(1) a first, resettable-multi-decade section connected to the output of said converter for counting said pulses, and (2) a second multi-decade section connected to said time-pulse emitter for counting said time pulses, (3) each decade position of said counter including four bi-stable elements for jointly representing a decimal number, (e) a multi-decade memory unit having a bi-stable element for each bi-stable element of the counter and connected thereto by a plurality of connecting circuits, there being a separate connecting circuit for each said bi-stable element, (f) normally closed gate means for said connecting circuits for the transfer of data simultaneously via said connecting circuiting when said gate means is open, (g) differentiator amplifier means also connected to said input circuit and adapted to detect the start of a rise in said signal voltage, (h) first timing means responsively connected to said differentiator amplifier and including outputs for (1) inhibiting at least the first section of said counter for a short predetermined period commencing at said start of the voltage rise and (2) for resetting the said first section at the end of said period, (i) second timing means responsively connected to said first timing means and including outputs for opening said gate means for a short transfer period which starts after the commencement of said predetermined time period by a delay time and ends before the end of said predetermined time period, (j) a converter for converting the data in each group of bi-stable elements of the memory unit into a single decimal digit, (k) means for scanning said bi-stable elements of the memory unit sequentially and connecting each in succession to the said converter, and (l) means for recording the output of said converter following each scanning operation.

References Cited by the Examiner

UNITED STATES PATENTS

| | | | |
|---|---|---|---|
| 1,884,681 | 10/1932 | Hentschel | 330—110 |
| 2,941,196 | 6/1960 | Raynsford et al. | 340—347 |
| 2,992,395 | 7/1961 | Rich | 330—110 |
| 3,040,300 | 6/1962 | Rabenda et al. | 340—172.5 |
| 3,060,409 | 10/1962 | Daniels et al. | 340—172.5 |
| 3,068,461 | 12/1962 | Gordon | 340—347 |
| 3,102,997 | 9/1963 | Dirks | 340—172.5 |
| 3,103,578 | 9/1963 | Dietrich | 235—151 |
| 3,142,820 | 7/1964 | Daniels | 340—172.5 |
| 3,167,644 | 1/1965 | Boehm | 235—183 X |
| 3,180,976 | 4/1965 | Robinson | 235—183 X |

MALCOLM A. MORRISON, *Primary Examiner.*

E. RONEY, I. KESCHNER, *Assistant Examiners.*